(12) United States Patent
Sato

(10) Patent No.: US 11,627,231 B2
(45) Date of Patent: Apr. 11, 2023

(54) INFORMATION PROCESSING DEVICE, AND NON- TRANSITORY COMPUTER-READABLE RECORDING MEDIUM THEREFOR

(71) Applicant: Brother Kogyo Kabushiki Kaisha, Nagoya (JP)

(72) Inventor: Hirotaka Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/646,020

(22) Filed: Dec. 27, 2021

(65) Prior Publication Data

US 2022/0217240 A1 Jul. 7, 2022

(30) Foreign Application Priority Data

Jan. 4, 2021 (JP) .............................. JP2021-000250

(51) Int. Cl.
 *H04N 1/00* (2006.01)
(52) U.S. Cl.
 CPC ....... *H04N 1/0097* (2013.01); *H04N 1/00244* (2013.01); *H04N 1/00973* (2013.01); *H04N 2201/0094* (2013.01)
(58) Field of Classification Search
 None
 See application file for complete search history.

(56) References Cited

U.S. PATENT DOCUMENTS

| | | | |
|---|---|---|---|
| 2009/0213407 A1* | 8/2009 | Kamiya | H04N 1/00222 358/1.15 |
| 2013/0201504 A1* | 8/2013 | Miller | G06F 3/1228 358/1.13 |
| 2017/0185356 A1* | 6/2017 | Kawaguchi | G06F 3/1285 |
| 2017/0289383 A1* | 10/2017 | Yanagawa | H04N 1/00204 |
| 2020/0195793 A1* | 6/2020 | Tajima | H04N 1/00477 |
| 2020/0374408 A1* | 11/2020 | Kawaguchi | H04N 1/00395 |
| 2021/0377403 A1* | 12/2021 | Kodera | H04N 1/00432 |
| 2022/0215503 A1* | 7/2022 | Sato | G06T 1/20 |

FOREIGN PATENT DOCUMENTS

JP 2017-117195 A 6/2017

* cited by examiner

*Primary Examiner* — Henok Shiferaw
(74) *Attorney, Agent, or Firm* — Burr Patent Law, PLLC

(57) ABSTRACT

A computer of an information processing device performs selecting an image processing device of the one or more image processing devices. Further, when one or more pieces of workflow information defining various settings and various processes with respect to the image processing devices are stored in a storage area accessible by the computer, the one or more pieces of workflow information being associated with device identification information identifying a target image processing device subjected to the various settings and the various processes, the computer reads workflow information associated with the device identification information identifying the target image processing device which is different from the image processing device selected in the selecting, and imports the read workflow information in a workflow information storage area of the memory.

8 Claims, 7 Drawing Sheets

FIG. 3A

| | ICON | WORKFLOW NAME | PRODUCT NAME | |
|---|---|---|---|---|
| ☐ | | WFA | ADS-A 11.22.33.01 | |
| ☐ | | WFB | ADS-A 11.22.33.01 | |
| ☐ | | WFC | ADS-A 11.22.33.01 | |
| ☑ | | WFD | MFP-A 11.22.33.44 | |
| ☐ | | WFE | MFP-A 11.22.33.44 | |

APPLICATION SETTINGS
- HELP
- ACCOUNT SETTINGS
- WORKFLOW MANAGEMENT
- PRODUCT INFORMATION
- SCAN SETTINGS FROM MAIN DEVICE

EDIT | DELETE | EXPORT | OPTION SETTINGS 222a, 222a2, 222a5, 222a1

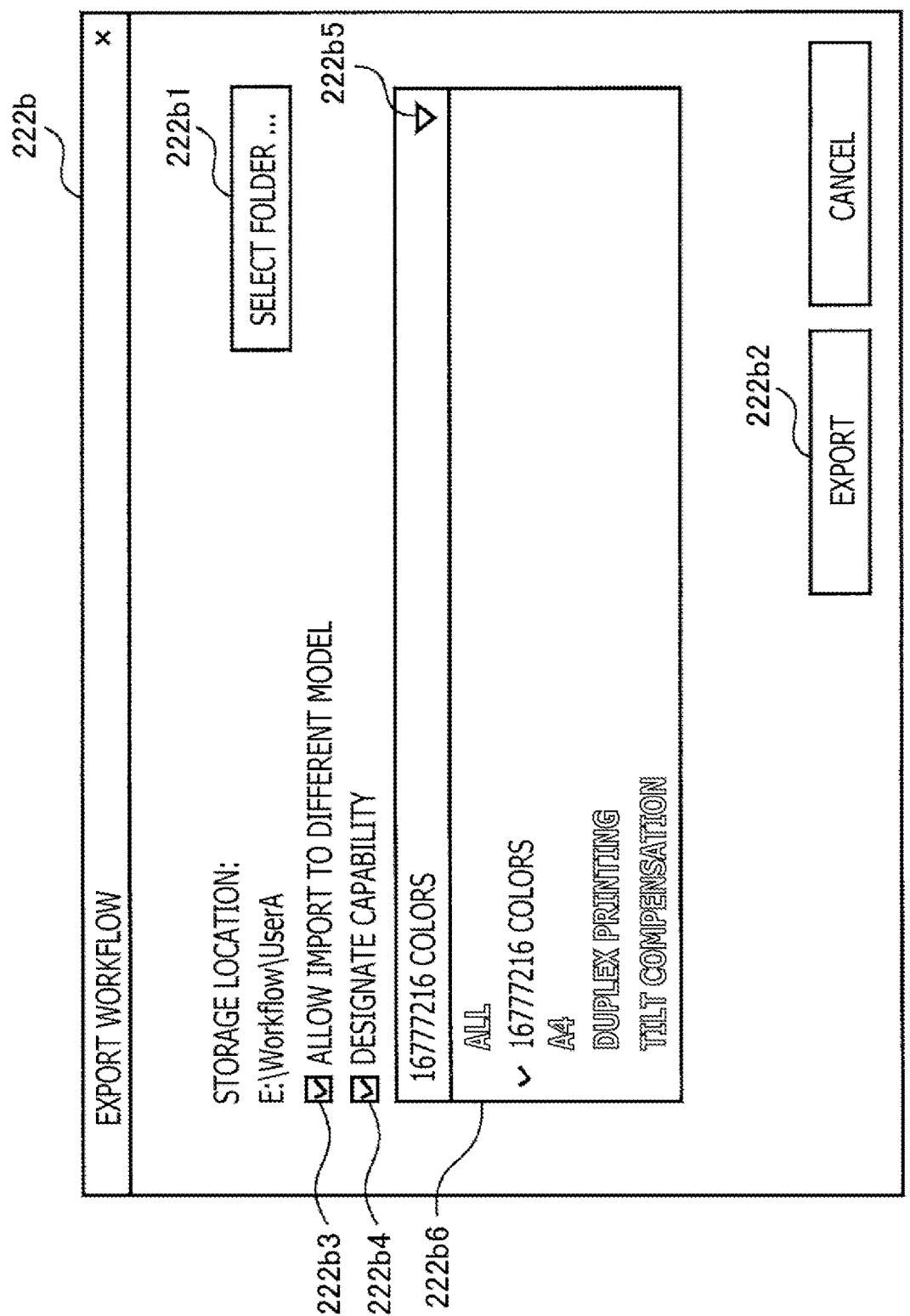

INFORMATION PROCESSING DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2021-000250 filed on Jan. 4, 2021. The entire subject matter of the application is incorporated herein by reference.

BACKGROUND

The present disclosures relate to a technology for importing workflow information.

Conventionally, there has been known a control program that stores workflow information associated with devices, and when a device is selected, displays the workflow information associated with the selected device.

SUMMARY

According to such a program, however, the workflow information is created in an information processing device that is configured to store and execute the workflow information, and importing workflow information created outside the information processing device into that device to use the same is not considered. Therefore, the control program according to the conventional art as described above does not take into account that the workflow information to be imported can be applied to image processing devices other than the target image processing device to which it is applied.

According to aspects of the present disclosure, a non-transitory computer-readable recording medium for an information processing device has a communication interface, a memory and a computer, and is configured to connect to one or more image processing devices through the communication interface. The recording medium contains computer-executable instructions cause, when executed by the computer, the information processing device to perform selecting an image processing device of the one or more image processing devices. When one or more pieces of workflow information defining various settings and various processes with respect to the image processing devices are stored in a particular storage area accessible by the computer, the one or more pieces of workflow information being associated with device identification information identifying a target image processing device, the target image processing device being a device subjected to the various settings and the various processes, The recording medium contains computer-executable instructions cause the information processing device to perform reading workflow information associated with the device identification information identifying the target image processing device which is different from the image processing device selected in the selecting, and importing the read workflow information in a workflow information storage area of the memory.

BRIEF DESCRIPTION OF THE DRAWINGS

FIGS. 3A and 3B show examples of screens displayed in the workflow export process.

DESCRIPTION OF THE EMBODIMENTS

Referring to the accompanying drawings, an embodiment according to the present disclosures will be described in detail.

Figure 1:
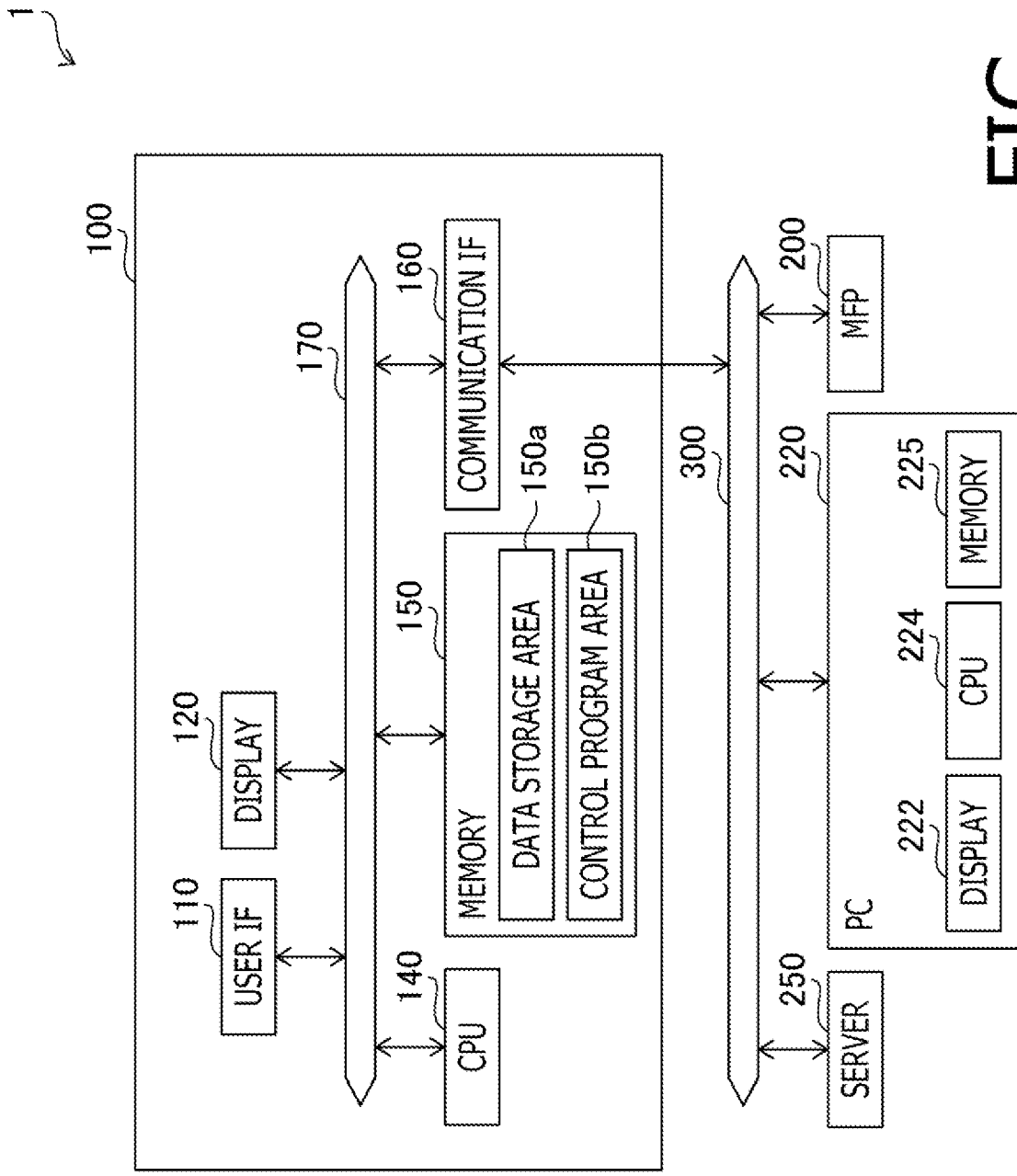
FIG. 1 is a block diagram of a control configuration of an image processing system according to the present disclosures.

FIG. 1 shows a control configuration of an image processing system 1 according to an embodiment of the present disclosures. The image processing system 1 has a PC 100 (an example of an "information processing device"), an MFP 200, a PC 220, and a server 250. The initialism "MFP" is an abbreviation for a multifunction peripheral.

The MFP 200 is a multifunctional peripheral having at least printing and scanning functions, and in some models, a facsimile function as well.

The PC 100 is equipped with a user IF 110, a display 120, a CPU 140 (an example of a "computer"), a memory 150 and a communication IF 160. The user IF 110, the display 120, the CPU 140, the memory 150, and the communication IF 160 are connected to each other via a bus 170. It is noted that the "IF" is an abbreviation for an interface.

The user IF 110 is typically provided with a keyboard and a mouse.

The display 120 includes a display device, such as a liquid crystal display or an organic EL display, and a drive circuit configured to drive the display device. When a touch panel type display is used as the display 120, the user can perform input operations by touching the input buttons displayed on the screen. In such a case, therefore, the display 120 also serves as the user IF 110.

The CPU 140 executes various application programs (hereinafter referred to as "applications") including information processing programs (an example of "programs"), firmware, and the like.

The memory 150 includes a ROM, a RAM, an HDD, an SSD, and optical disk drive. A data storage area 150a of the memory 150 is an area for storing data necessary for the CPU 140 to execute information processing programs and the like. A control program area 150b of the memory 150 is an area for storing an OS, information processing program, and various other applications and firmware.

The memory 150 may be a computer-readable storage medium. A computer-readable storage medium is a non-transitory medium, which includes recording media such as CD-ROMs and DVD-ROMs, in addition to the examples above. A non-transitory medium is also a tangible medium. On the other hand, electrical signals carrying programs downloaded from servers on the Internet, or the like, are computer-readable signal media, which is a type of computer-readable media, but are not included in the non-transitory computer-readable storage media.

In this description, a process of the CPU 140 according to instructions described in the program will be indicated basically. In other words, processes of "determination," "extraction," "selection," "calculation," "decision," "identification," "acquisition," "reception," "control," "setting," and the like in the following description represent the processes of the CPU 140. The processes executed by the CPU 140 include hardware control via the OS. In addition, "acquisition" is used in a concept that does not require a request. In other words, the process of receiving data without a request by the CPU 140 is also included in the concept of "acquisition of" data by the CPU 140. Further, "data" in this specification is represented by a computer-readable bit string. It is noted that data with the same substantive meaning content but different formats will be treated as the same data. The same applies to "information" in this specification. In addition, processes of "command," "response," "request," and the like is performed by communicating information indicating "command," "response," "request," and the like. The words "instruction," "response," "request," and the like may be described in the sense of the information itself indicating the "instruction," "response," "request," and the like.

Various applications, including information processing programs, can be downloaded from the server 250 via the communication IF 160.

The communication IF 160 is configured to connect the PC 100 to the communication network 300. In the present embodiment, the MFP 200, the PC 220, and the server 250 are connected to the communication network 300. Therefore, the communication IF 160 is capable of communicating with the MFP 200, the PC 220, and the server 250 via the communication network 300. The communication network 300 may be a network of various forms. For example, the communication network 300 may be a wired or wireless LAN, WAN, USB, Bluetooth (registered trademark), NFC network, or the like.

In addition to the function of supplying various applications including information processing programs as described above, the server 250 also has, according to the present embodiment, a function of storing a workflow file (an example of "workflow information") and supplying the same in response to a request from the PC 100. The workflow is, in the present embodiment, information that specifies various settings and various processes for various image processing devices including the MFP 200, and it is possible to apply the specified various settings and various processes to the target image processing device by an extremely simple user operation, for example, just by clicking a WFa icon 132*c* or a WFD icon 132*d* (see FIG. 6) described below. In the present embodiment, the workflow is assumed to specify a target image processing device and execute various settings and various processes on the target image processing device, and accordingly, a workflow is associated with the target image processing device. Any method of association can be used to associate the workflow with the target image processing device. For example, model name identification information (an example of "device identification information") that identifies the target image processing device by its model name may be included in the workflow or such information may be attached to the workflow. In the present embodiment, a method of associating a workflow with the target image processing device by including the model name identification information in the workflow.

The workflow file is stored in a particular area in a storage device of the server 250, that is, for example, in a workflow storage folder (which is an example of a "particular storage area," and hereinafter referred to as a "server-side workflow storage folder"). Therefore, when the PC 100 downloads a workflow file from the server 250, the PC 100 downloads the workflow file stored in the server-side workflow storage folder. It is noted that the workflows can be created and/or edited by users, on the PC 100 as is done conventionally, but the workflow file stored in the server 250 can be created and edited only by an operator with a particular authority, for example, administrator authority (hereinafter referred to as "administrator"), and a user of the PC 100 who does not have the administrator authority cannot create and/or edit the workflow. In addition, a workflow created and edited by the user within the PC 100 can be freely edited by the user of PC 100 within PC 100, but a workflow file downloaded from the server 250 into the PC 100 cannot be freely edited by the user of the PC 100 within the PC 100 even after downloaded into the PC 100. Such a configuration is, however, only an example, and the configuration may be modified such that the user of the PC 100 can freely edit the same within the PC 100 after downloading.

Further, the server 250 also has a function of storing external files and supplying them to the PC 100 in response to requests from the PC 100. The information processing program is, according to the present embodiment, a program that performs various controls on various image processing devices including the MFP 200, and the external file is, in the present embodiment, a file that describes default values of various setting items used by the information processing program in performing various controls on the MFP 200. The external file, as well as the workflow file stored in the server 250, can be created and/or edited only by the administrator, and is placed in a particular folder on a storage device of the server 250, and a particular file name is assigned to the external file.

It is noted that, the "workflow file" means a file that contains therein information of a "workflow," but, in the following description, in some cases, it is difficult to strictly distinguish between the "workflow file" and "workflow." In such cases, the "workflow file" may be described as the "workflow" or vice versa.

The PC 220 is a PC used by the administrator. Therefore, the workflow created in the PC 220 can be uploaded to the server-side workflow storage folder. The control configuration of the PC 220 is the same as that of PC100, but only a display 222, a CPU 224, and a memory 225 are shown in FIG. 1 for convenience of explanation.

Figure 2:
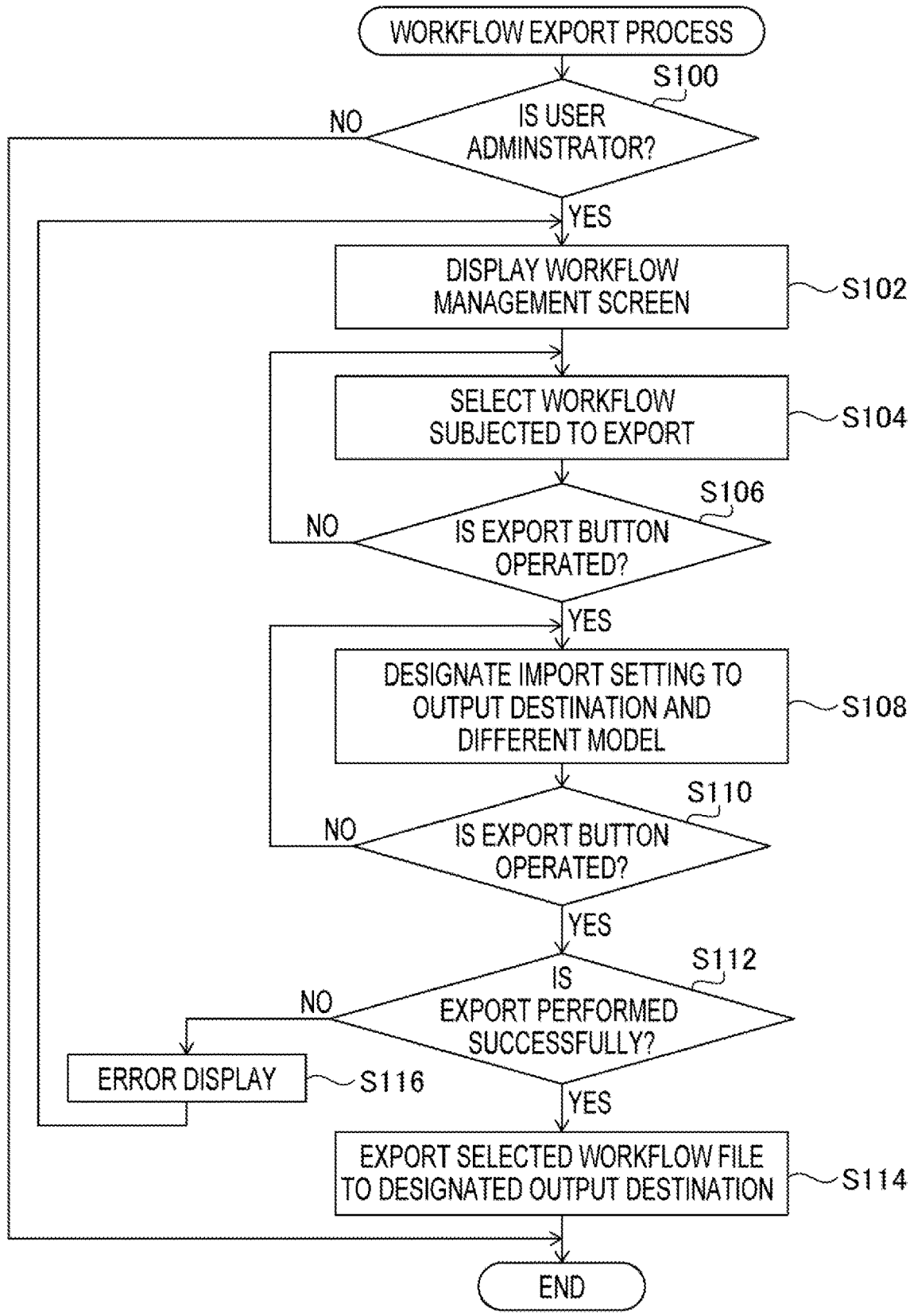
FIG. 2 is a flowchart illustrating a workflow export process.

FIG. 2 is a flowchart illustrating a workflow export process to be executed by the PC 220, in particular by the CPU 224. The workflow export process is initiated when, for example, an operator of the PC 220 performs an operation, on the display 222, to instruct the execution of an application setting. It is noted that, "workflow export" means uploading of the workflow file created in the PC 220 to the server-side workflow storage folder of the server 250. Hereinafter, in the description of each process, "step" is denoted by "S."

In FIG. 2, the CPU 224 first determines whether the operator is an administrator or not (S100). In this determination, when the operator is not an administrator (S100: NO), the CPU 224 terminates the workflow export process. On the other hand, when the operator is determined to be an administrator (S100: YES), the CPU 224 displays a workflow management screen on the display 222 (S102).

FIG. 3A shows a workflow management screen 222*a* displayed on the display 222. Since the workflow management screen 222*a* is the screen when a "Workflow Management" tab 222*a*5 is selected as shown in FIG. 3A, the administrator has performed the operation of selecting the "Workflow Management" tab 222*a*5 before the process advances to S102. The workflow management screen 222*a* shows a plurality of workflows created in the PC 220, together with icons, workflow names and product names (model names), and the like. The workflow to be exported is indicated by placing a check mark in the check box displayed to the left of the icon. In the example shown in FIG.

3A, a check box 222a1 for the workflow of which workflow name is "WFD" (hereinafter referred to as "workflow WFD") is marked with the check mark, thus the workflow WFD is the export target. When an "export" button 222a2 is operated, the workflow management screen 222a transitions to a workflow export screen 222b shown in FIG. 3B.

Returning to FIG. 2, the CPU 224 selects a workflow to be exported according to a user operation, i.e., an operation to put the check mark in a check box (S104). Then, the CPU 224 continues the selection process of S104 until the "export" button 222a2 is operated (S106: NO). When the "export" button 222a2 is operated (S106: YES), the CPU 224 advances the process to S108. At this time, the workflow export screen 222b of FIG. 3B is displayed on the display 222.

As shown in FIG. 3B, a "select folder" button 222b1 and the "export" button 222b2 are displayed on the workflow export screen 222b. The "select folder" button 222b1 is used to select a folder to which the workflow file selected on the workflow management screen 222a is to be exported. When the "select folder" button 222b1 is operated, for example, a folder selection screen (not shown) for selecting a folder pops up, and the administrator can select a folder from the folder selection screen to which folder the workflow file is to be exported. In the present embodiment, the administrator selects the server-side workflow storage folder because the folder to which the workflow file is to be exported is the server-side workflow storage folder of the server 250 as described above. In the present embodiment, "E:\Workflow\userA" is used as the folder path of the server-side workflow storage folder, so the path is displayed as the storage location in the workflow export screen 222b. On the other hand, the "export" button 222b2 displays the path to the saved location. On the other hand, the "export" button 222b2 is a button for instructing the export of the selected workflow file to the selected folder.

Further, in the workflow export screen 222b, a check box 222b3 for selecting whether to allow import of the workflow selected in the workflow management screen 222a to models different from the model to which the workflow is applied and a check box 222b4 for selecting whether to specify an indispensable capability (an example of a "indispensable setting item") are also displayed. Is is noted that not checkling check box 222b3 is an example of import prohibition instruction information. As described above, the workflow specifies the image processing device to which the workflow is applied and executes various settings and various processes for the specified image processing device. Therefore, in principle, the workflow is not applied to an image processing device other than an applicable device (i.e., the target image processing device). However, in some cases, such as when the workflow to be applied is not stored in the workflow storage folder on the server 250, it may be necessary to apply the workflow to an image processing device other than the applicable device (i.e., the target image processing device). In this embodiment, the check box 222b3 is provided to deal with such a case. That is, by inserting a check mark in the check box 222b3, the file of the workflow to be exported contains different model import permission information that indicates that importing to a different model is permitted. The different model import permission information is used in the decision of S30 (FIG. 4) described below.

On the other hand, an indispensable capability is a capability for controlling when a workflow is allowed to be imported into a different model, even if the workflow is allowed to be imported into the different model, unless the different model has the same capability as the capability (configuration item) contained in the workflow. It is noted that the indispensable capability is an example of import prohibition instruction information. The check box 222b4 is for selecting whether to specify the indispensable capability by adding the check mark. When the check mark is added in the check box 222b4 and thereby the designation of the indispensable capability is enabled, a pull-down menu 222b6 can be displayed, in which one or more capabilities can be selected as the indispensable capability from among a plurality of capabilities. The pull-down menu 222b6 is displayed in response to operation of an arrow "V" button 222b5. The administrator can select a capability to serve as an indispensable capability by selecting one of the multiple capabilities listed in the pull-down menu 222b6. The selected capability will be marked with the check mark. In the workflow export screen 222b, "16777216 colors" (about 16.77 million) is selected as the indispensable capability.

Returning to FIG. 2, the CPU 224 designates the output destination, i.e., the export destination, according to the user operation on the workflow export screen 222b, i.e., the click operation of the "select folder" button 222b1 and the input operation on the folder selection screen that pops up accordingly (S108). Further, the CPU 140 designates the import setting to the different model in accordance with the input operation of the check boxes 222b3 and 222b4 and the selection operation of one of the capabilities described in the pull-down menu 222b6 (S108). Then, the CPU 224 continues the designation process of S108 until the export button 222b2 is operated (S110: NO). When the export button 222b2 is operated (S110: YES), the CPU 224 advances the process to S112.

In S112, the CPU 224 determines whether the export is successfully performed. In this determination, when the export is successfully performed (S112: YES), the CPU 224 exports the file of the workflow selected in S104 to the output destination designated in S108 above (S114), and then terminates the workflow export process. On the other hand, when the export fails (S112: NO), the CPU 224 displays an error display including a message informing that the export has failed on the display 222 (S116). Then, the CPU 224 returns the process to S102 above and performs the process from S102 again.

In this way, according to the workflow export process, a file of the workflow which is selected from among the workflows created in the PC 220 to the workflow storage folder on the server 250. Further, the file of the workflow to be exported may contain the different model import permission information and the indispensable capability.

Figure 4:
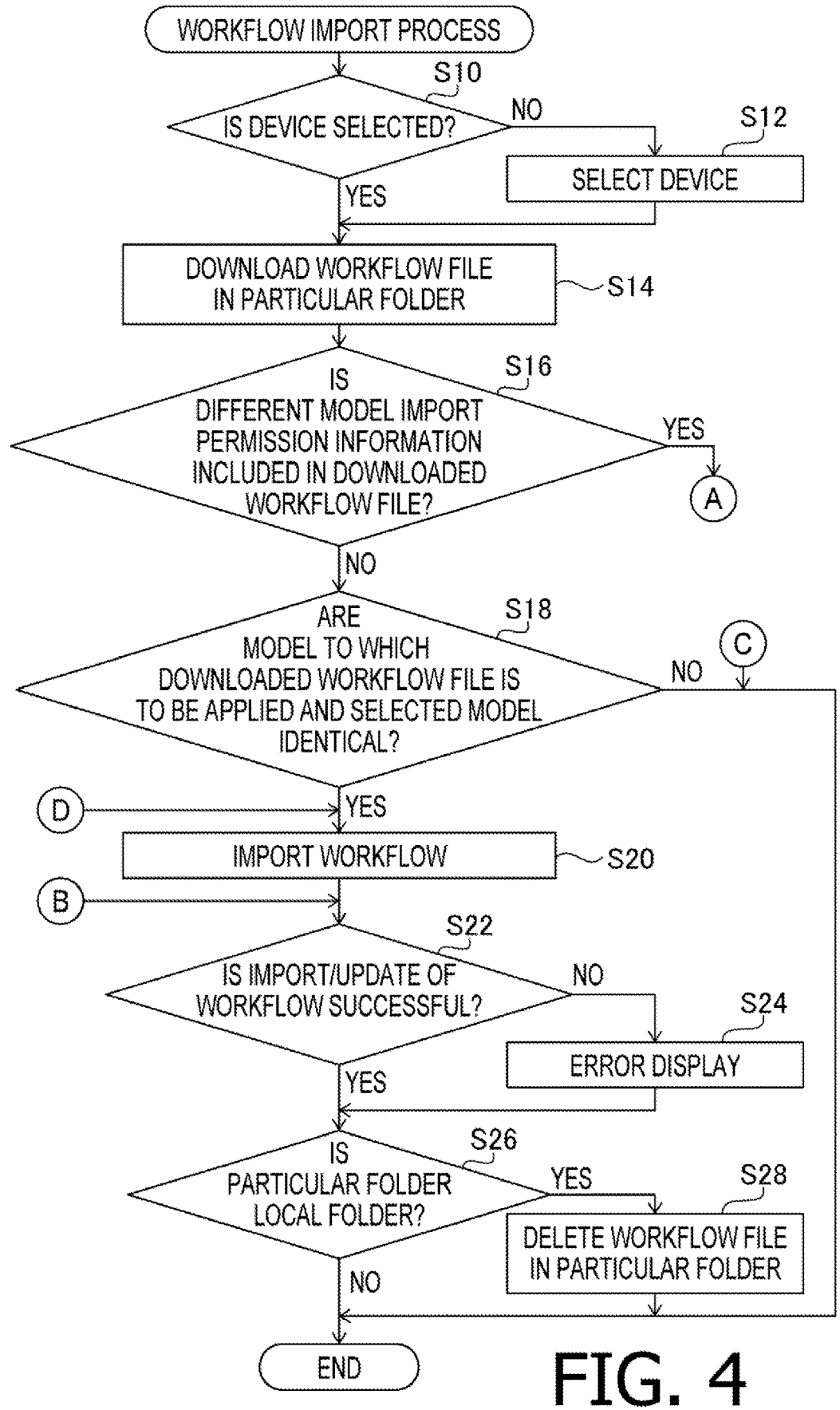
FIGS. 4 and 5 show a flowchart illustrating a workflow import process.
Figure 5:
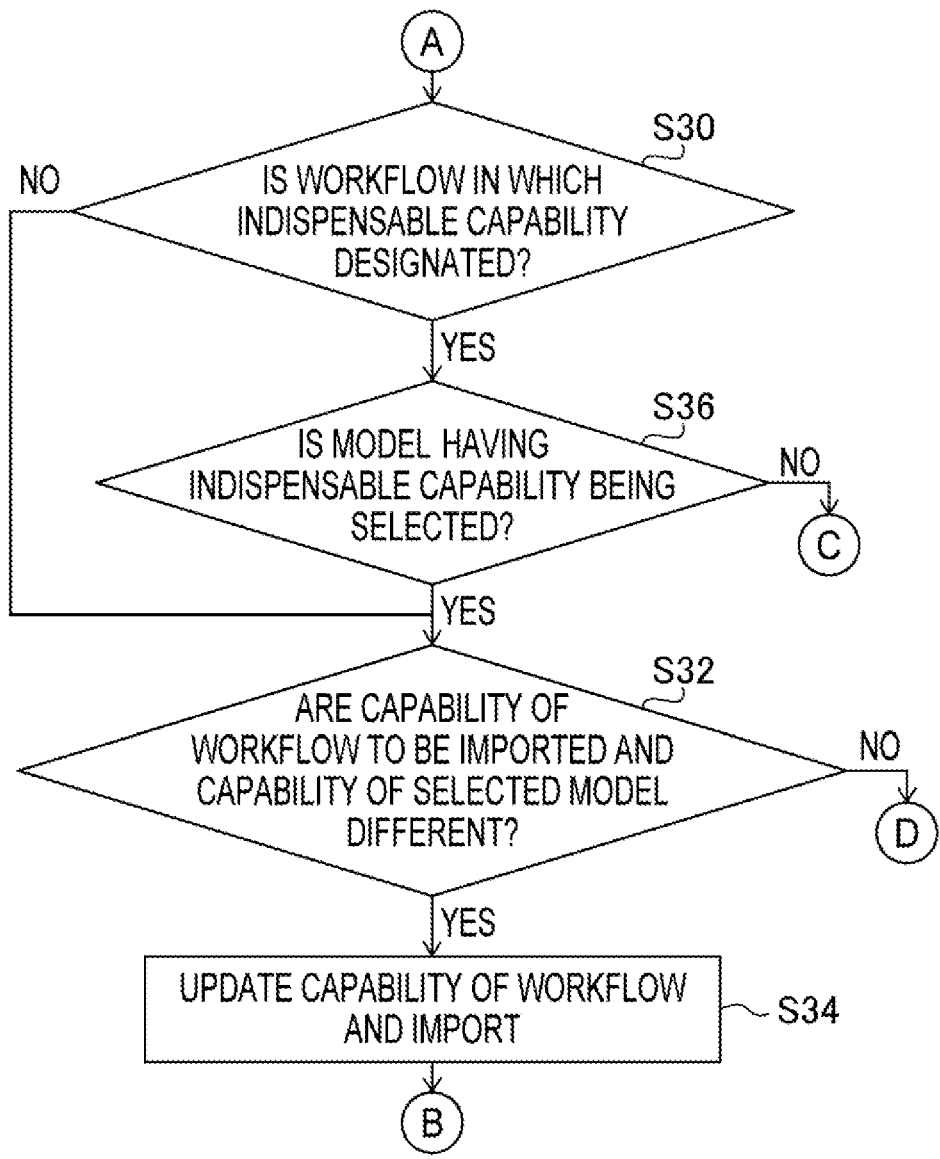

FIGS. 4 and 5 show a workflow import process executed by the PC 100, in particular the CPU 140. The workflow import process is included in the information processing program. When the information processing program is started, the CPU 140 accesses the server 250 at a particular timing and downloads the above external file from the server 250. The external file contains the folder path of the server-side workflow storage folder if there is a workflow to be imported. Thus, when the folder path of the server-side workflow storage folder is described in the downloaded external file, the CPU 140 starts the workflow import process. The particular timing may be, for example, a timing immediately after starting the information processing program or a timing at which the initial screen (hereinafter referred to as the "home screen") is to be displayed while the information processing program is being executed.

In FIG. 4, the CPU 140 first determines whether a device (an image processing device, in this embodiment), is selected (S10). In this determination, when no device is selected (S10: NO), the CPU 140 prompts the user to select a device. Then, the CPU 140 selects the device that the user designates to be selected in response thereto (S12), and advances the process to S14. On the other hand, when the device has already been selected (S10: YES), the CPU 140 skips S12 and advances the process to S14.

Figure 6:
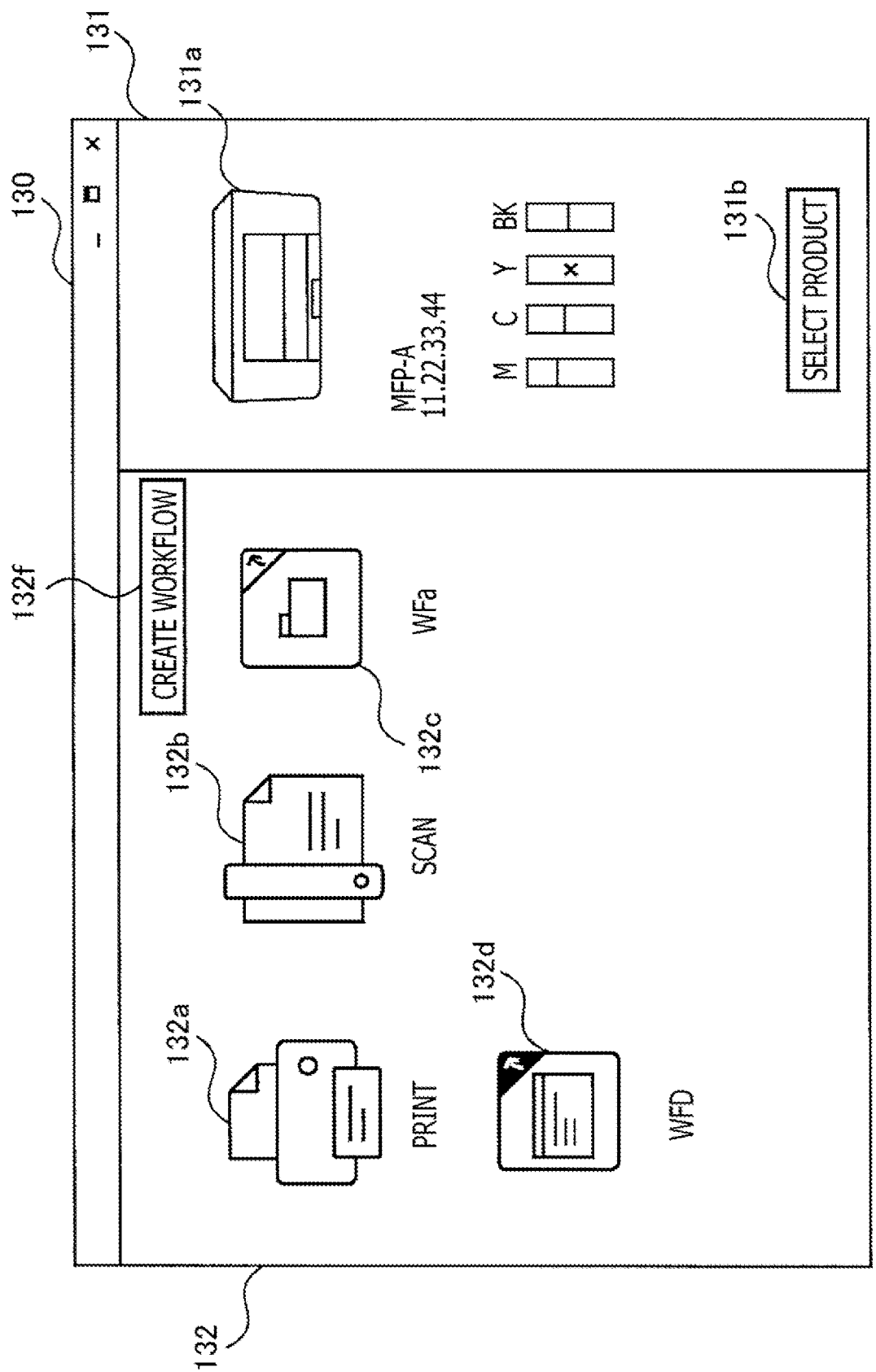
FIG. 6 shows an example of a screen displayed after the workflow import process is executed.

FIG. 6 shows an example of the home screen 130 displayed on the display 120 by the CPU 140 executing the information processing program. The home screen 130 shows the state after the above workflow WFD has been imported in the workflow import process. Therefore, when the workflow import process is started for the first time, since the above workflow WFD has not yet been imported, the WFD icon 132d, which instructs the execution of the workflow WFD, is not displayed on the home screen. On the other hand, the WFa icon 132c is still displayed on the home screen. The WFa icon 132c is an icon for instructing the execution of a workflow named "WFa" (hereinafter referred to as a "workflow WFa"), and the WFa icon 132c is displayed on the home screen since the workflow WFa is a workflow created by the user in the PC 100 as described above.

As shown in FIG. 6, the home screen 130 has a selected device display area 131 where devices to be controlled are selected and displayed. In the selected device display area 131, the MFP 200, which has already been selected as the control target, is displayed as an icon 131a. The MFP 200 is a multifunctional peripheral of a model name "MFP-A" and an IP address "11.22.33.44" are assigned. A "select product" button 131b is a button to be operated when a device to be controlled has not been selected, or when the currently selected device is to be changed to another device. When the "select product" button 131b is operated, the image processing devices connected to the communication network 300 are displayed in a listed manner, and the user can select any of them as the device to be controlled.

The home screen 130 also has a function listing area 132. The function listing area 132 is an area that lists the functions of the device displayed in the selected device display area 131. Since the device of the model name "MFP-A", i.e., the MFP 200, is a multifunctional peripheral having a print function and a scan function as described above, the function listing area 132 displays a print icon 132a indicating the print function, a scan icon 132b indicating the scan function. In addition, the above WFa icon 132c and the above WFD icon 132d are also displayed in the function listing area 132. However, the WFD icon 132d is not displayed in the function listing area 132 at the time when the workflow import process is first started and the process advances to S14, as described above.

It is noted that, in addition to the icons 132a through 132d, a "create workflow" button 132f is also displayed in the function listing area 132. The "create workflow" button 132f is a button that is operated when the user creates a workflow in the PC 100, as the workflow WFa above. When the "create workflow" button 132f is operated, the CPU 140 displays a workflow creation screen (not shown) on the display 120. When the user creates a workflow on the workflow creation screen and instructs to save the workflow, the CPU 140 stores the file of the created workflow in a particular area on the memory 150, such as a workflow storage folder (which is an example of a "workflow information storage area" and hereinafter referred to as a "PC-side workflow storage folder").

Returning to FIG. 4, in S14, the CPU 140 downloads a workflow file stored in a particular folder of the server 250 (i.e., the above serve-side workflow storage folder) to a temporary storage area of the memory 150. When the process advances to S14, the external file contains the folder path of the above server-side workflow storage folder, so in S14, the CPU 140 downloads the workflow file existing in the folder indicated by the folder path to the temporary storage area of the memory 150.

Next, the CPU 140 determines whether different model import permission information is included in the workflow file downloaded to the temporary storage area of the memory 150 (S16). In this determination, when the different model import permission information is not included (S16: NO), the CPU 140 determines whether the model name indicated by the above-described model name identification information included in the downloaded workflow file is the same as the model name of the currently selected device (S18). In this determination, when the model name indicated by the model name identification information and the model name of the currently selected device are different (S18: NO), the CPU 140 terminates the workflow import process. In this case, the downloaded workflow file is not imported. On the other hand, when the model name indicated by the model name identification information is the same as the model name of the currently selected device (S18: YES), the CPU 140 imports the downloaded workflow file (S20), and then the CPU 140 advances the process to S22 (FIG. 5). FIG. 6 shows the home screen 130 after the execution of the workflow importing process as described above. In the function listing area 132 of the home screen 130, the WFD icon 132d is displayed for instructing the execution of the imported workflow WFD. The WFD icon 132d is displayed in a different manner from the WFa icon 132c for the workflows created in the PC 100 in such a way that it is easily recognizable as being an icon for an imported workflow.

On the other hand, in the determination in S16 above, when the different model import permission information is included (S16: YES), the CPU 140 determines whether the indispensable capability is included in the workflow (S30). In this determination, when the indispensable capability is included (S30: YES), the CPU 140 determines whether the currently selected device has the indispensable capability (S36). In this determination, when the currently selected device does not have the indispensable capability (S36: NO), the CPU 140 terminates the workflow importing process. In this case, the downloaded workflow file is not imported. On the other hand, when the currently selected device has the indispensable capability (S36: YES), the CPU 140 advances the process to S32.

On the other hand, when the indispensable capability is not included in the determination in S30 above (S30: NO), the CPU 140 skips S36 and advances the process to S32.

In S32, the CPU 140 determines whether there is a different capability between the workflow that is to be imported and the currently selected device. When it is determined that there is no different capability (S32: NO), the CPU 140 advances the process to S20 and executes import of the workflow that is about to be imported. On the other hand, when there is a different capability (S32: YES), the CPU 140 updates the capability of the workflow that is about to be imported, executes import (S34), and then advances the process to S22 (FIG. 5). In the determination of S32, the decision of "YES" means that one or more of the setting items in the workflow to be imported has an item that cannot be set for the currently selected device, for example, in a case where a workflow that contains settings for scanning A3 documents is to be imported to a device that is not capable of scanning A3 documents. In such a case, in the process of updating the workflow in S34, the CPU 140 performs, for example, the process of enabling the 2-in-1 scan setting of an A4 document instead of the A3 document scan setting included in the workflow. Then, the CPU 140 imports the workflow after updating the capability in this manner. In this concrete example, the CPU 140 updates the capability without adopting the intention of the user. The configuration is not necessarily limited to the above, but can be modified such that the user may be allowed to select the items and their values to be substituted for the items that cannot be set, the CPU 140 may be configured to update the capability using the items and values selected by the user, and may be configured to import the updated workflow.

In S14, there is a possibility that a plurality of workflow files are downloaded. In such a case, the CPU 140 may perform processes from S16 onwards for each of the plurality of workflow files.

In S22 of FIG. 5, the CPU 140 determines whether the import/update of the workflow file has succeeded. In this determination, when the import/update of the workflow file has failed (S22: NO), the CPU 140 displays an error display including a message informing that the import/update of the workflow file has failed on the display 120 (S24), and then advances the process to S26. On the other hand, when the workflow file has been successfully imported/updated (S22: YES), the CPU 140 skips S24 and advances the process to S26.

In S26, the CPU 140 determines whether the particular folder, that is, the server-side workflow storage folder, is a local folder. In the determination of S26, when the server-side workflow storage folder is the local folder (S26: YES), the CPU 140 deletes the workflow file in the server-side workflow storage folder, that is, the imported workflow file. If the server-side workflow storage folder is the local folder in the determination of S26 (S26: YES), the CPU 140 deletes the workflow file in the server-side workflow storage folder, that is, the imported workflow file (S28), and then terminates the workflow import process. The reason for deleting the imported workflow file in the server-side workflow storage folder is that the imported workflow file cannot be imported when the server-side workflow storage folder is the local folder.

On the other hand, in the determination of S26, when the server-side workflow storage folder is not the local folder (S26: NO), the CPU 140 terminates the workflow import process. The reason why the imported workflow file in the server-side workflow storage folder is not deleted in this way is that when the server-side workflow storage folder is not the local folder, the imported workflow file may be imported by another user after it is imported.

Thus, according to the workflow import process, the workflow WFD file created outside of the PC 100 can be imported into the PC 100 for use. Further, even if the model to which the workflow WFD is applied is different from the currently selected model, the workflow WFD can be imported into that different model.

Aspects of the present disclosures are not necessarily limited to the configuration of the above embodiment, but various changes can be made without departing from aspects of the present disclosures.

(1) In the above embodiment, the PC 100 is a PC used by general users and the PC 220 is a PC used by administrators, but the configuration is not limited to the above and may be modified such that, for example, the PC 100 is a PC both general users and the administrators can use. In such a case, whether the user is an administrator or not should be indicated in the external file above, and in S100 of FIG. 2, whether the user is an administrator or not should be determined based on whether the user is indicated as an administrator or not in the external file.

(2) In the above-described embodiment, the workflow file to be imported into the PC 100 is placed on the storage device in the server 250, but it may also be placed on the memory 150 of the PC 100. In this case, the workflow file created by the administrator in the PC 220 can be directly stored in the memory 150 of the PC 100.

(3) In the above-described embodiment, the external file is stored on the storage device in the server 250, but it may also be stored on the memory 150 of the PC 100. In this case, the external file should be stored in a particular area on the memory 150 together with the information processing program when it is installed in the PC 100. Another possible method is for the user of the PC 100 to read the external file and store it in a particular area on the memory 150 after being given a USB memory or other device that stores the external file.

(4) In the above embodiment, a display format of the icon is differentiated so that the user can recognize that it is an imported workflow and that it is a workflow created in the PC 100. However, it is also possible to change the appearance of the icon name displayed below the icon without changing the appearance of the icon itself. In addition to changing the display format of the icon, the display format of the icon name may also be changed. In addition, any method of changing the display style, such as display color, pattern, shape, font, and the like may be used.

(5) In the above embodiment, a display format of the icon is differentiated so that the user knows that it is an imported workflow and that it is a workflow created in the PC 100. However, it is also possible to change the appearance of the icon name displayed below the icon without changing the appearance of the icon itself In addition to changing the display format of the icon, the display format of the icon name may also be changed. In addition, any method of changing the display style, such as display color, pattern, shape, font, and the like may be used.

What is claimed is:

1. A non-transitory computer-readable recording medium for an information processing device having a communication interface, a memory and a computer, and is configured to connect to one or more image processing devices through the communication interface, the recording medium containing computer-executable instructions which cause, when executed by the computer, the information processing device to perform:

selecting an image processing device of the one or more image processing devices; and when one or more pieces of workflow information defining various settings and various processes with respect to the one or more image processing devices are stored in a particular storage area accessible by the computer, and when the one or more pieces of workflow information includes target workflow information associated with device identification information identifying a target image processing device subjected to the various settings and the various processes, the target image processing device being a device different from the image processing device selected in the selecting, reading the target workflow information associated with the device identification information identifying the target image processing device which is different from the image processing device selected in the selecting, and importing the read target workflow information in a workflow information storage area of the memory.

2. The non-transitory computer-readable recording medium according to claim 1, wherein the instructions cause, when executed by the computer, the information processing device to further perform:

when the workflow information is imported in the importing, determining whether there is a value that cannot be set to the selected image processing device among values of setting items to be set by the workflow information; and when it is determined, in the determining, that there is a value that cannot be set to the selected image processing device among the values of the setting items to be set by the workflow information, changing the value that cannot be set to the selected image processing device to a settable value, and wherein, in a case where the workflow information is imported, when it is determined in the determining that there is a value that cannot be set to the selected image processing device among the values of the setting items to be set by the workflow information, changing the value that cannot be set to the selected image processing device to the settable value in the changing and importing the workflow information in the importing.

3. The non-transitory computer-readable recording medium according to claim 2, wherein a setting item subjected to the determining can be included in the workflow information as an indispensable setting item, and wherein, in a case where the workflow information including the indispensable setting item is imported, when it is determined in the determining that there is a value that cannot be set to the indispensable setting item, the workflow information is not imported in the importing.

4. The non-transitory computer-readable recording medium according to claim 2, wherein the instructions cause, when executed by the computer, the information processing device to further perform selecting one or more items from the setting items to be set by the workflow information as the indispensable setting item.

5. The non-transitory computer-readable recording medium according to claim 2, wherein, in the importing, the information processing device imports the workflow information without performing the determining when importing the workflow information that does not include the indispensable setting item.

6. The non-transitory computer-readable recording medium according to claim 1, wherein import prohibition instruction information can be included in the workflow information, the import prohibition instruction information being information instructing prohibition of importing the workflow information to an image processing device different from the target image processing device identified by the device identification information, and wherein, in a case where the workflow information is imported, when the import prohibition instruction information is included in the workflow information, the workflow information is not imported in the importing.

7. The non-transitory computer-readable recording medium according to claim 6, wherein the instructions cause, when executed by the computer, the information processing device to further perform:

exporting the workflow information as created to the particular storage area; and setting whether or not to include the import prohibition instruction infon ation into the workflow information subjected to the exporting before the exporting.

8. An information processing device, comprising:
a communication interface;
a memory; and
a controller having hardware,
wherein the information processing device is configured to connect to one or more image processing devices through the communication interface,
wherein the controller is configured to perform:
selecting an image processing device of the one or more image processing devices; and
when one or more pieces of workflow information defining various settings and various processes with respect to the one or more image processing devices are stored in a particular storage area accessible by the computer, and when the one or more pieces of workflow information includes target workflow information associated with device identification information identifying a target image processing device, the target image processing device being a device subjected to the various settings and the various processes, the target image processing device being a device different from the image processing device selected in the selecting,
reading the target workflow information associated with the device identification information identifying the target image processing device which is different from the image processing device selected in the selecting; and
importing the read target workflow information in a workflow information storage area of the memory.

* * * * *